(12) United States Patent
Konrath

(10) Patent No.: US 12,089,780 B2
(45) Date of Patent: Sep. 17, 2024

(54) UNIVERSAL AND REMOVABLE DIFFUSER FOR A GRILL

(71) Applicant: Michael Konrath, North Port, FL (US)

(72) Inventor: Michael Konrath, North Port, FL (US)

( * ) Notice: Subject to any disclaimer, the term of this patent is extended or adjusted under 35 U.S.C. 154(b) by 163 days.

(21) Appl. No.: 17/068,494

(22) Filed: Oct. 12, 2020

(65) Prior Publication Data
US 2022/0110482 A1 Apr. 14, 2022

(51) Int. Cl.
A47J 37/07 (2006.01)

(52) U.S. Cl.
CPC .............................. A47J 37/0786 (2013.01)

(58) Field of Classification Search
CPC .................................................. A47J 37/0786
See application file for complete search history.

(56) References Cited

U.S. PATENT DOCUMENTS

| | | | | |
|---|---|---|---|---|
| 3,088,393 A | * | 5/1963 | Huckabee | A47J 37/06 99/450 |
| D283,588 S | * | 4/1986 | Stuckey | D7/332 |
| 5,086,752 A | | 2/1992 | Hait | |
| 6,971,305 B1 | * | 12/2005 | Thomas | A23B 4/0523 99/482 |
| 7,832,330 B1 | * | 11/2010 | Thompson | A47J 37/0786 99/481 |
| 9,003,962 B2 | | 4/2015 | Broerman | |
| 9,867,383 B2 | | 1/2018 | Borovicka | |
| 10,021,889 B2 | | 7/2018 | Vinett | |
| 10,278,538 B2 | | 5/2019 | Cammon | |
| 2002/0166460 A1 | | 11/2002 | O'Shea | |
| 2008/0257174 A1 | * | 10/2008 | Turner | A23B 4/052 99/516 |
| 2009/0025574 A1 | | 1/2009 | Byrnes et al. | |
| 2012/0266760 A1 | | 10/2012 | Bryce et al. | |
| 2012/0285338 A1 | * | 11/2012 | Anderson, Sr. | A47J 37/048 99/441 |
| 2014/0299005 A1 | * | 10/2014 | Vinett | A23B 4/052 99/482 |
| 2014/0311356 A1 | | 10/2014 | Daniels | |
| 2021/0212514 A1 | * | 7/2021 | Hunt | F23N 1/007 |

FOREIGN PATENT DOCUMENTS

| | | | | |
|---|---|---|---|---|
| EP | 1024333 | A2 | 8/2000 | |
| FR | 2794015 | A1 | * 12/2000 | ........... A47J 37/0694 |

* cited by examiner

Primary Examiner — Michael G Hoang
Assistant Examiner — Logan P Jones
(74) Attorney, Agent, or Firm — Mark C. Johnson; Johnson |Dalal

(57) ABSTRACT

A universal, adjustable, and removable heat and flavor diffuser for a grill that is selectively removably coupled to a grill assembly, namely disposed within a pellet grill and disposed above a heat source, primarily a fire pot, thereon. The present invention comprises a platform body coupled to, separating, and supported by two opposing legs, the platform body defining an enclosed tray aperture wherein a diffusing tray is selectively removably inserted therein. The sidewall and the bottom wall of the diffusing tray define a diffusing cavity designed to house liquid and/or solid flavor enhancers, such as smoking chips, chunks, pellets or aromatics. A diffusing lid is selectively removably coupled to the diffusing tray. All of the foregoing features may be of a substantially rigid and heat-resistant material composition, plating, or coating.

11 Claims, 8 Drawing Sheets

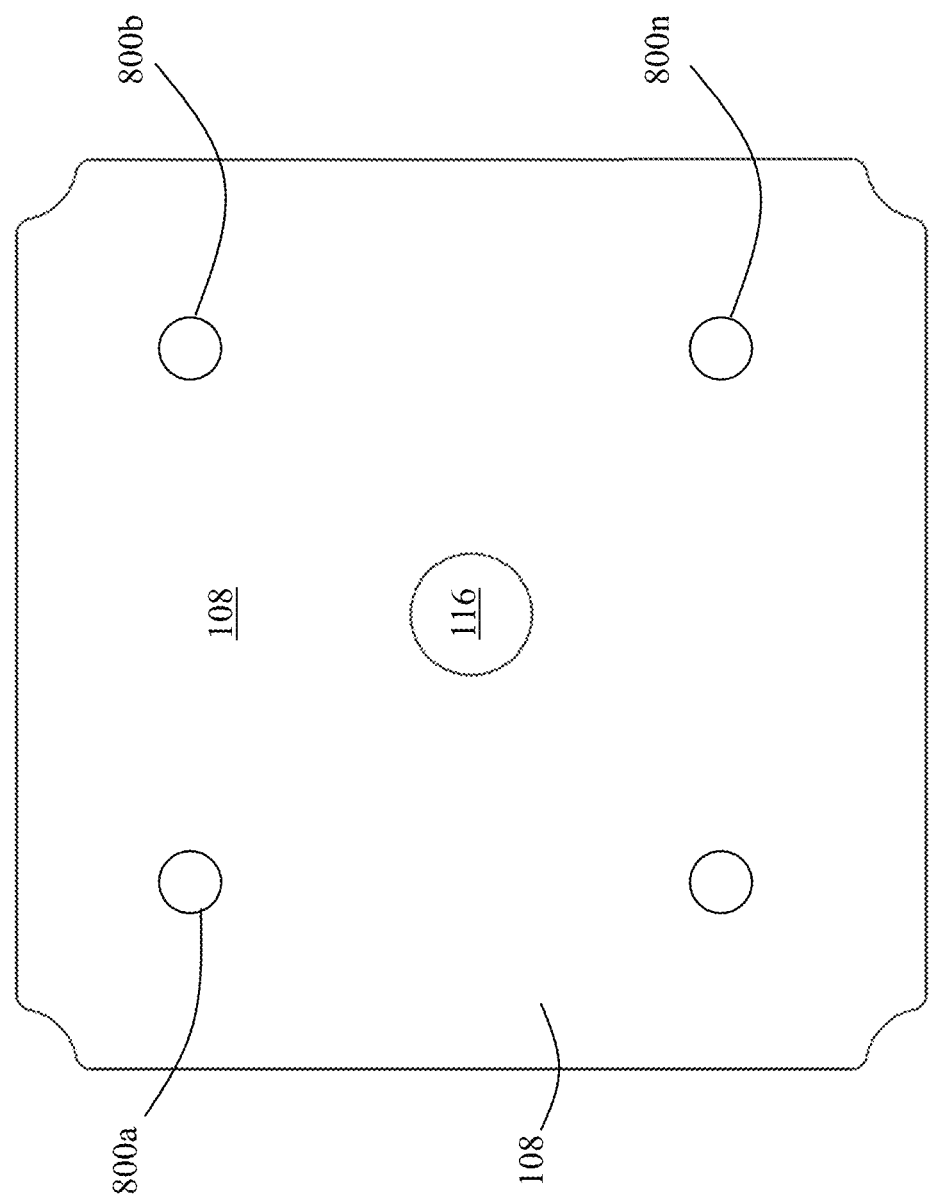

UNIVERSAL AND REMOVABLE DIFFUSER FOR A GRILL

FIELD OF THE INVENTION

The present invention relates generally to heat diffusers, and, more particularly, relates to a heat diffuser selectively removably coupled to a grill assembly, namely disposed with a pellet grill and disposed above a heat source, primarily a fire pot, thereon.

BACKGROUND OF THE INVENTION

While various assemblies exist in the marketplace for providing heat diffusion and flavor infusion of food products cooked on grills, none are universal, removable, and adjustable to fit all grill types and to accommodate the use of both liquid and solid flavoring enhancers. Some principal types of grills are charcoal grills, gas grills, electric grills, and pellet grills. Charcoal and pellet grills provide users with the most direct method of customizing the flavor of food cooked therein, more specifically, by enabling users to use different types of charcoal briquettes, wood chips, and/or wood pellets as the chosen grilling fuel. Pellet grills operate on pellets (primarily made of wood) that range in flavor from hickory and alder, to mesquite and apple. The wood pellets are emptied and stored inside a pellet hopper. The auger delivers the wood pellets to a housing container (commonly referred to as a "fire pot"), where an igniter sets fire to the wood pellets. As the pellets burn, they emit smoke and heat which is evenly circulated throughout the enclosed pellet grill. The food sitting on the cooking grate is thereby evenly cooked and smoked.

With these limited options in mind, users are left to search for supplemental methods, techniques, and assemblies to supply them with the tailored and customizable flavors and cooking temperatures they seek. Existing heat diffusers and smoker boxes provide some relief for users, but they lack features which allow them to conveniently adjust to fit all grill types, to adjust to choose the desired cooking method, e.g., char, sear, barbecue, etc., and to selectively input and remove the specific types of flavor enhancers the user wishes to incorporate.

Therefore, a need exists to overcome the problems with the prior art as discussed above.

SUMMARY OF THE INVENTION

The invention provides a universal, removable, and adjustable heat diffuser for a grill (hereinafter referred to as "diffuser") that overcomes the hereinafore-mentioned disadvantages of the heretofore-known devices and methods of this general type and that is operably configured to selectively adjust in height so as to fit within all types and brands of grills. The heat diffuser features a diffusing tray and lid, wherein the diffusing tray is operably configured to store liquid or solid flavor enhancers for the tailored flavoring of the food products placed on the cooking grate. The degree of diffused flavor may be selectively adjusted by use of the diffusing lid.

With the foregoing and other objects in view, there is provided, in accordance with the invention, a universal and removable diffuser for a grill comprising two opposing legs each of substantially rigid and heat-resistant material and having a lower free end and an upper end opposite the lower free end. The present invention also includes a platform body of a substantially rigid and heat-resistant material and coupled to, separating, and supported by the two opposing legs, the platform body and having an upper wall defining an enclosed tray aperture.

In accordance with another feature of the present invention, there is provided a diffusing tray selectively removably coupled to the platform body, of a substantially rigid and heat-resistant material, and having a sidewall surrounding a bottom wall of the diffusing tray, the sidewall and the bottom wall defining a diffusing cavity and a bottom surface of the bottom wall interposed between the enclosed tray aperture and the lower free end and defining a tray position length separating the bottom surface of the bottom wall and the lower free end.

There is also provided a diffusing lid selectively removably coupled to the diffusing tray, of a substantially rigid and heat-resistant material, and of a size to cover the enclosed tray aperture, and defining at least one enclosed vent aperture thereon.

In accordance with an exemplary embodiment of the present invention, the lower free end of each of the two opposing legs further comprise a substantially planar lower support surface operably configured to be substantially co-planar with one another.

In accordance with another feature, each of the two opposing legs further comprise a plurality of leg members operably configured to selectively translate along a leg translation path and positionally lock with respect to one another, the translation path adjusting the tray position length separating the bottom surface of the bottom wall from the lower free end.

In another embodiment, the plurality of leg members are operably configured to selectively linearly translate with respect to one another.

In accordance with yet another feature, the enclosed tray aperture is centrally disposed and defined by the upper wall of the platform body.

In a further embodiment of the present invention, the sidewall of the diffusing tray further comprises opposing flange members disposed at an upper end of the sidewall and protruding from two opposing respective sides and having a lower surface selectively, removably, and directly coupled to the upper wall of the platform body.

In accordance with another feature, the sidewall of the diffusing tray further comprises flange members disposed at, and protruding a perimeter around, an upper end of the sidewall and having a lower surface selectively, removably, and directly coupled to the upper wall of the platform body.

In another embodiment of the present invention, the diffusing lid is of a size to cover at least approximately 90% of the enclosed tray aperture. The diffusing lid may also include a plurality of vent apertures.

In another exemplary embodiment of the present invention, there is provided a universal and removable diffuser for a grill comprising two opposing legs having a lower free end and an upper end opposite the lower free end; a platform body coupled to, separating, and supported by the two opposing legs, the platform body having an upper wall defining an enclosed tray aperture; a diffusing tray directly coupled to the platform body and having a sidewall surrounding a bottom wall of the diffusing tray, the sidewall and the bottom wall defining a diffusing cavity and a bottom surface of the bottom wall interposed between the enclosed tray aperture and the lower free end and defining a tray position length separating the bottom surface of the bottom wall and the lower free end; and a diffusing lid directly coupled to the diffusing tray and of a size to cover the enclosed tray aperture, and defining at least one enclosed vent aperture thereon.

In accordance with a further feature, the diffusing lid is selectively removably coupled to the diffusing tray.

In accordance with yet another feature, at least one of the two opposing legs, platform body, diffusing tray, or diffusing lid is of a substantially rigid and heat-resistant material.

In another embodiment, the diffusing lid includes a plurality of vent apertures thereon.

Although the invention is illustrated and described herein as embodied in a universal and removable diffuser for a grill, it is, nevertheless, not intended to be limited to the details shown because various modifications and structural changes may be made therein without departing from the spirit of the invention and within the scope and range of equivalents of the claims. Additionally, well-known elements of exemplary embodiments of the invention will not be described in detail or will be omitted so as not to obscure the relevant details of the invention.

Other features that are considered as characteristic for the invention are set forth in the appended claims. As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one of ordinary skill in the art to variously employ the present invention in virtually any appropriately detailed structure. Further, the terms and phrases used herein are not intended to be limiting; but rather, to provide an understandable description of the invention. While the specification concludes with claims defining the features of the invention that are regarded as novel, it is believed that the invention will be better understood from a consideration of the following description in conjunction with the drawing figures, in which like reference numerals are carried forward. The figures of the drawings are not drawn to scale.

Before the present invention is disclosed and described, it is to be understood that the terminology used herein is for the purpose of describing particular embodiments only and is not intended to be limiting. The terms "a" or "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The term "coupled," as used herein, is defined as connected, although not necessarily directly, and not necessarily mechanically. The term "providing" is defined herein in its broadest sense, e.g., bringing/coming into physical existence, making available, and/or supplying to someone or something, in whole or in multiple parts at once or over a period of time. Furthermore, there is no intention to be bound by any expressed or implied theory presented in the preceding technical field, background, brief summary or the following detailed description.

As used herein, the terms "about" or "approximately" apply to all numeric values, whether or not explicitly indicated. These terms generally refer to a range of numbers that one of skill in the art would consider equivalent to the recited values (i.e., having the same function or result). In many instances these terms may include numbers that are rounded to the nearest significant figure. In this document, the term "longitudinal" should be understood to mean in a direction corresponding to an elongated direction of the universal and removable diffuser. The term "traverse" should be understood to mean in a direction spanning horizontally across the universal and removable diffuser.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and explain various principles and advantages all in accordance with the present invention.

FIG. 8 is a top plan view of a diffusing lid, in accordance with an exemplary embodiment of the present invention.

DETAILED DESCRIPTION

Figure 1:
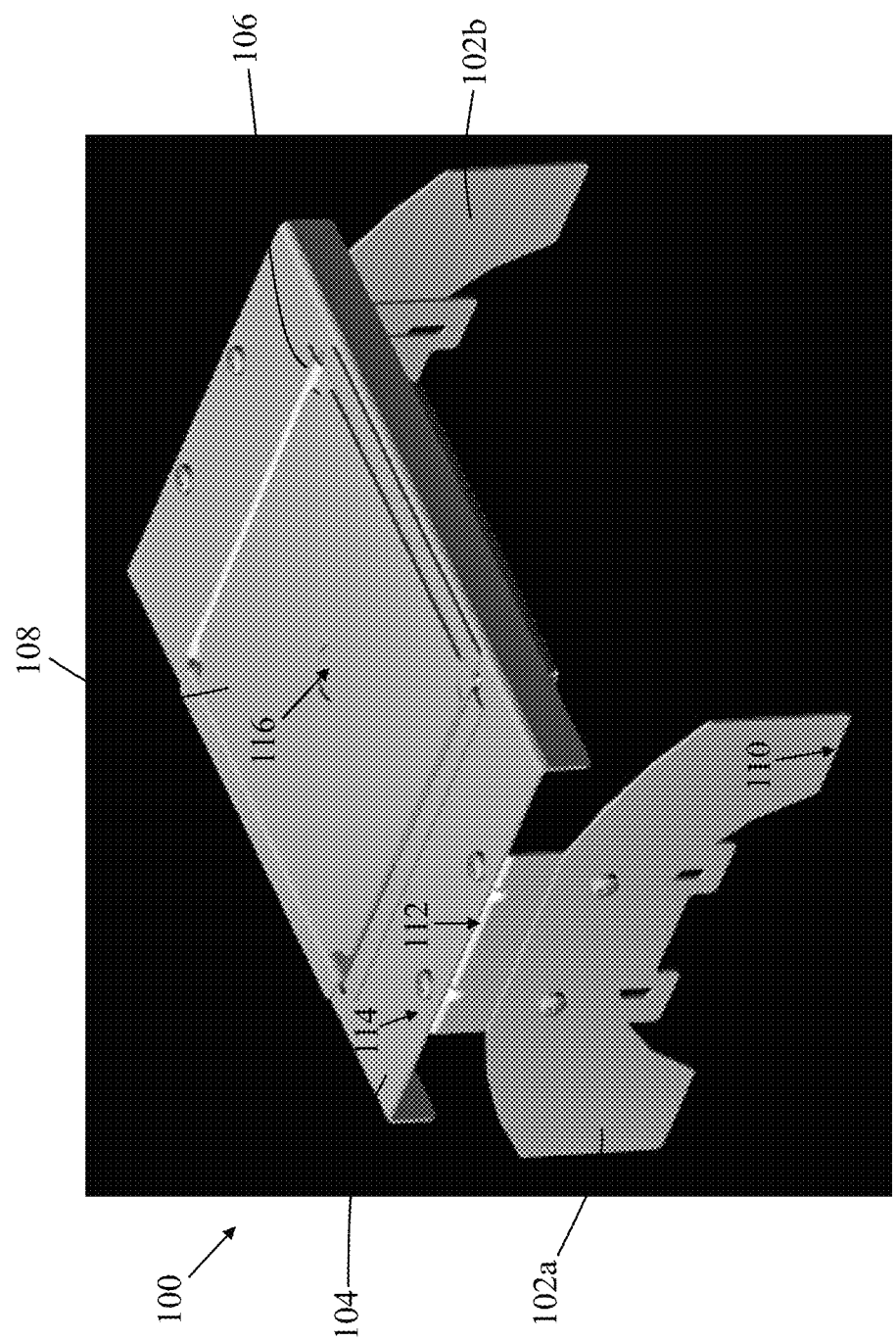
FIG. 1 is a downward facing perspective view of a diffuser, in accordance with an exemplary embodiment of the present invention.

While the specification concludes with claims defining the features of the invention that are regarded as novel, it is believed that the invention will be better understood from a consideration of the following description in conjunction with the drawing figures, in which like reference numerals are carried forward. It is to be understood that the disclosed embodiments are merely exemplary of the invention, which can be embodied in various forms.

The present invention provides a novel and efficient heat diffuser for a grill. Embodiments of the invention provide features which enable the diffuser to selectively adjust in height to accommodate different sizes, brands, and types of grill and/or fire pots. An exemplary embodiment of the invention is used in connection with a pellet grill, though the diffuser may also be used in connection with gas, electric, and charcoal grills. The diffuser is designed to sit over the fire pot in all pellet grills or, alternatively, may sit over the fire source and below the cooking grate in other types of grills.

Referring now to FIG. 1, one embodiment of the present invention is shown in a downward facing perspective view of a diffuser. FIG. 1 shows several advantageous features of the present invention, but, as will be described below, the invention can be provided in several shapes, sizes, combinations of features and components, and varying numbers and functions of the components. The first example of a diffuser 100, as shown in FIG. 1, includes two opposing legs 102a-b and a platform body 104 coupled to, separating, and supported by the two opposing legs 102a-b.

Figure 4:
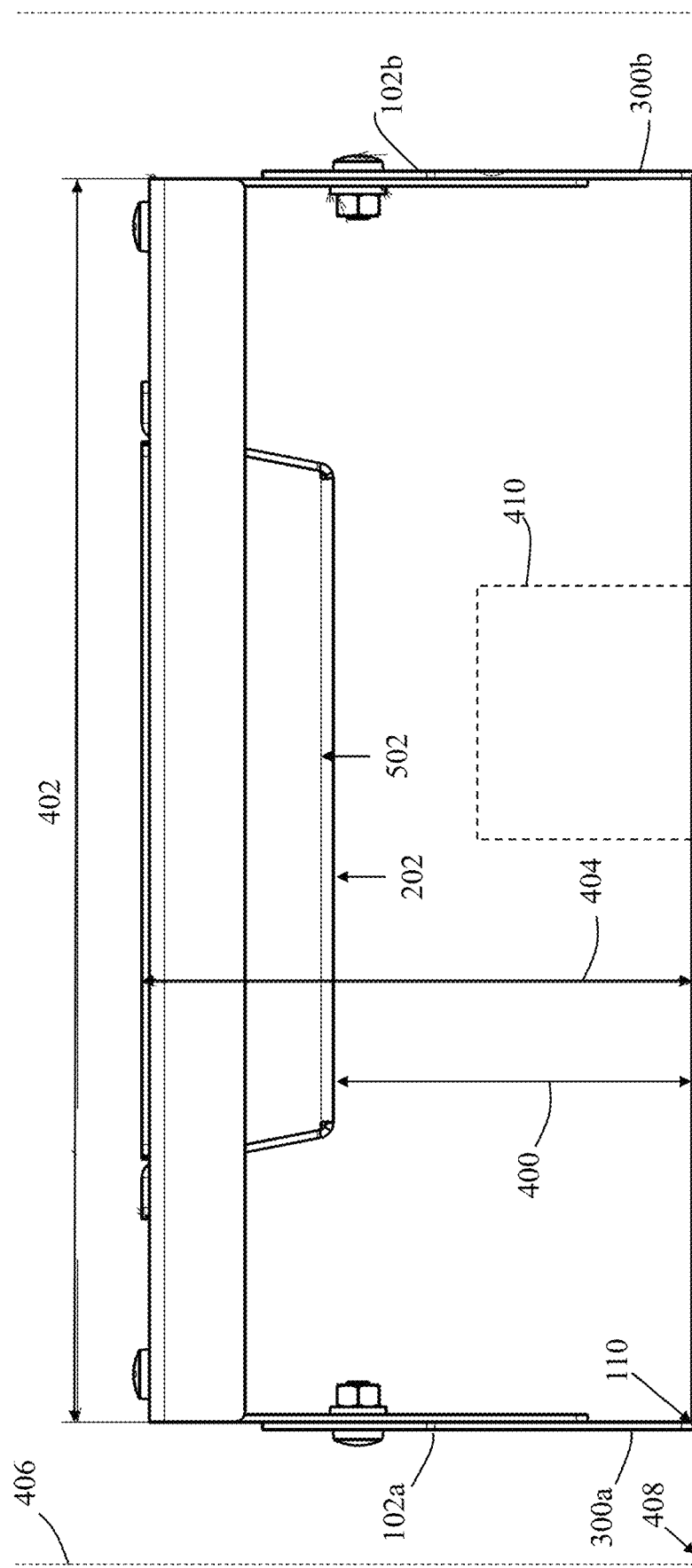
FIG. 4 is an elevational front view of a diffuser, in accordance with an exemplary embodiment of the present invention.

It should be understood that terms such as, "front," "rear," "side," "top," "bottom," and the like are indicated from the reference point of a viewer viewing the diffuser 100 from a position, such as that depicted in FIG. 4, wherein the platform body 104 is seen sitting between and connecting the two opposing legs 102a-b on either side. A reference point referred to herein is not to be construed as limiting any feature to be a particular orientation, as said orientation may be changed based on the user's perspective of the device.

In an exemplary embodiment and also with reference to FIG. 1 and FIG. 4, the two opposing legs 102a-b each have a lower free end 110 and an upper end 112 opposite the lower free end 110. An object of the lower free end 110 is to rest on an internal grill surface 408 of a pellet grill 406 that supports the fire pot housing 410 (or, as is the case when the diffuser is in storage and not in use, to rest on any substantially planar surface, wherein "planar" is defined as flat and two-dimensional) which, in an exemplary embodiment, is the substantially planar surface abutting the fire pot housing 410 of the pellet grill 406. Said differently, the lower free end 110 is designed to rest on a stable and flat surface (e.g., surface 408) so as to provide structural support and balance to the rest of the diffuser 100 assembly when in use. This support ensures that the diffuser 100 does not wobble, lean, or fall during use, i.e. when the diffuser 100 is in use.

The two opposing legs 102a-b are each of a substantially rigid and heat-resistant material so as to ensure that said parts can successfully sustain the high temperatures that grills can climb to. Because most grills can climb up to 900° F., "substantially heat-resistant" is defined as any ceramic, metallic, or other material that can withstand temperatures greater than approximately 900° F. In an exemplary embodiment, stainless steel plating is used on the two opposing legs 102a-b, wherein the stainless-steel plating is comprised of iron, carbon and a percentage of chromium that prevents rusting. "Substantially rigid" is defined as any material that can resist deformation or abrasion with approximately 200 lbf tensile force, has a yield strength of approximately 20 kilo-pounds per square inch ("KSI"), or has a hardness greater than approximately 20 Rockwell B-Scale.

Figure 6:
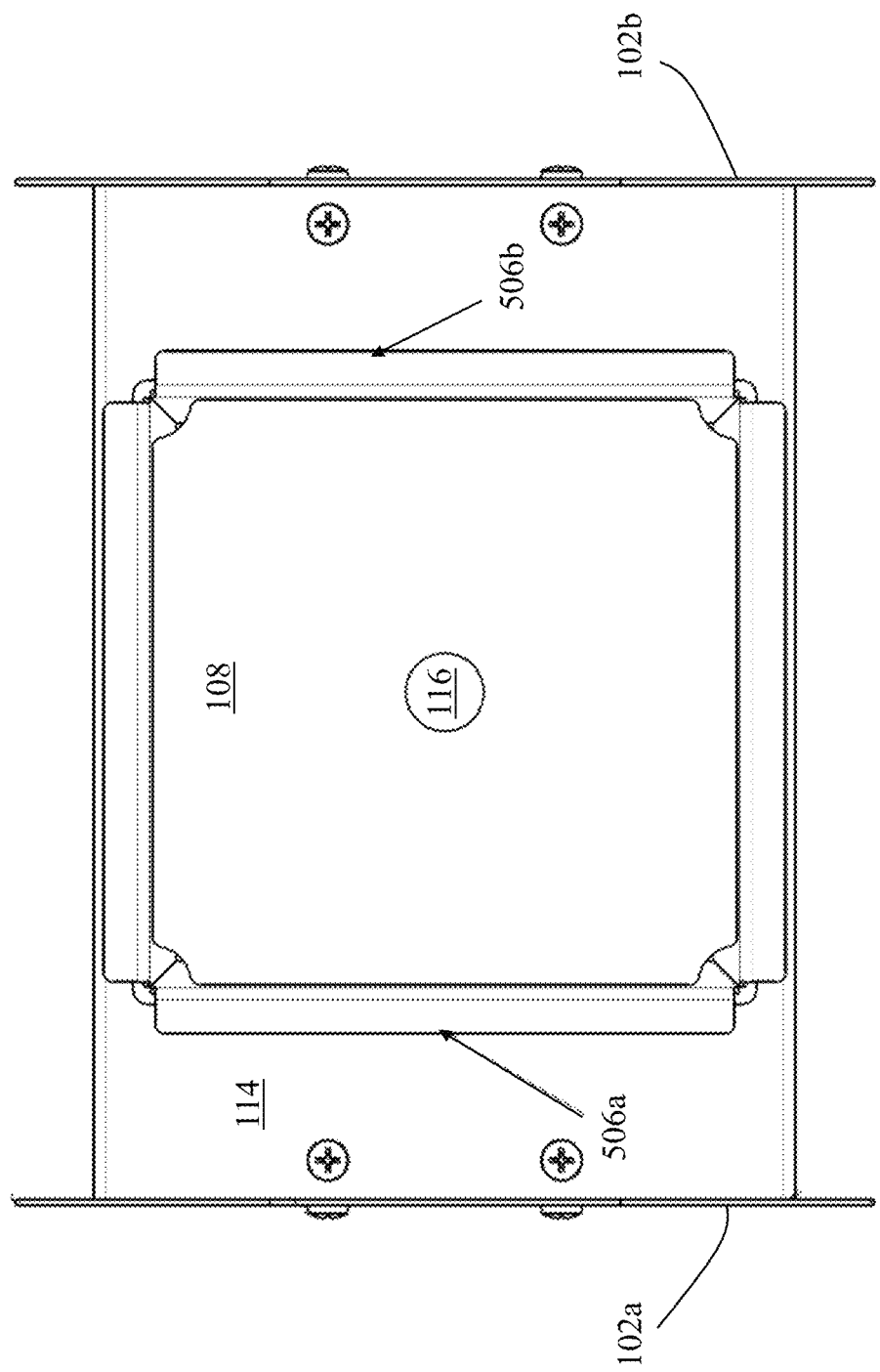
FIG. 6 is a top plan view of a platform body and diffusing tray, in accordance with the present invention.
Figure 7:
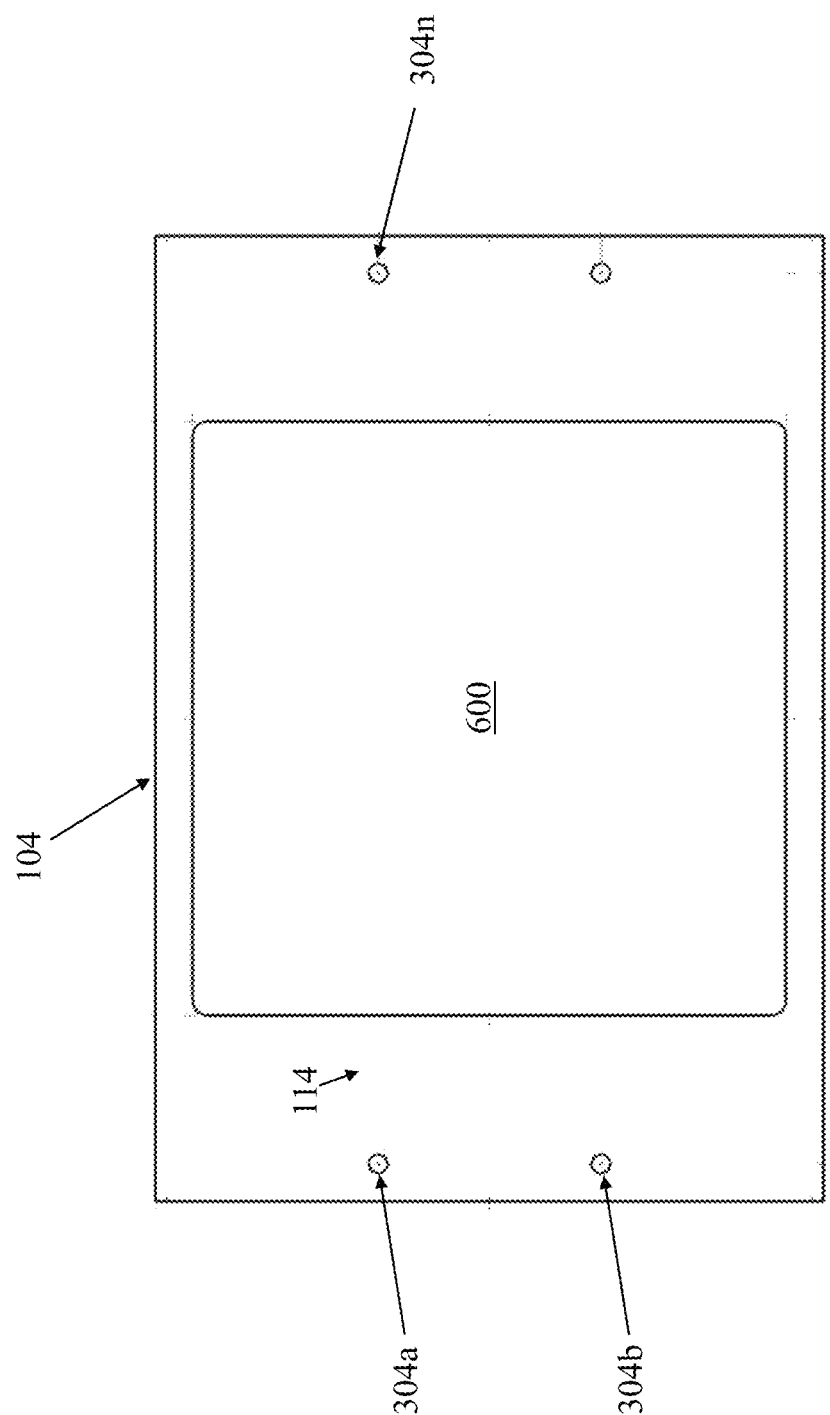
FIG. 7 is a top plan view of a platform body and diffusing tray, in accordance with the present invention.

In accordance with a further feature, the platform body 104 is coupled to, separates, and supports the two opposing legs 102a-b. The platform body 104 traverses the diffuser 100, connecting the two opposing legs 102a-b. The platform body 104 also has an upper wall 114 defining an enclosed tray aperture 600, best seen in FIG. 6. An object of the platform body 104 is to support the two opposing legs 102a-b, as well as to define the enclosed tray aperture 600 and to support the weight of a diffusing tray 106, and the contents therein, which selectively removably sits within the enclosed tray aperture 600. In one embodiment, the platform body 104 is directly coupled to the two opposing legs 102a-b by at least one bolt 304a-n, wherein "n" refers to any number greater than one. Certain embodiments may utilize other techniques or mechanisms to directly couple the platform body 104 to the two opposing legs 102a-b, such as a screw.

The platform body 104 is of a substantially rigid and heat-resistant material, wherein "substantially heat-resistant" is defined as any ceramic, metallic, or other material that can withstand temperatures greater than approximately 900° F. and "substantially rigid" is defined as any material that can resist deformation or abrasion with approximately 200 lbf tensile force, has a yield strength of approximately 20 KSI, or has a hardness greater than approximately 20 Rockwell B-Scale.

In accordance with a further feature of the present invention, there is provided the diffusing tray 106 which is selectively removably coupled to the platform body 104. The selectively removable feature of the diffusing tray 106 enables it to be removed by a user before use so it may be filled with the particular liquid or solid flavor enhancers that the user desires to infuse their food contents with. After use, the removable feature of the diffusing tray 106 allows it to be removed from the enclosed tray aperture 600 so that any remaining solid flavor enhancers may be disposed of and the diffusing tray 106 may be cleaned and sanitized for future use. Notably, users may remove the diffusing tray 106 to utilize the fire pot's intense flames to allow for alternate cooking techniques including, but not limited to, wok cooking, deep frying, stock pot cooking (producing smokey soups, stews, chili, etc.), deep frying, and griddling for extreme searing. Said another way and with reference to FIG. 4 and FIG. 6, the diffusing tray 106 is removable to enable the fire pot housing 410 to generate intense flames directly below the enclosed tray aperture 600.

As best seen in FIGS. 1, 2, 4, and 5, the diffusing tray 106 has a sidewall 500 surrounding a bottom wall 502 of the diffusing tray 106, the sidewall 500 and the bottom wall 502 defining a diffusing cavity 504 and a bottom surface 202 of the bottom wall 502 interposed between the enclosed tray aperture 600 and the lower free end 110 and defining a tray position length 400 separating the bottom surface 202 of the bottom wall 502 and the lower free end 110. In different embodiments, the diffusing tray 106 may be available in greater (and/or smaller) heights to accommodate a greater (and/or smaller) number or size of solid and liquid flavor enhancers.

As best seen in FIG. 4, the tray position length 400 will vary depending on the height of the diffusing tray 106 used, e.g. a greater diffusing tray 106 height will result in a shorter tray position length 400. A platform length 402 spans transversely across the platform body 104 from one of the two opposing legs 102a to the other 102b. In exemplary embodiments, the platform length 402 ranges between approximately 12 inches and 14 inches.

An object of the diffusing cavity 504 is to house and store the liquid and solid flavor enhancers users desire, e.g. smoking chips, chunks, pellets or aromatics, for infusion of flavor into the food contents being cooked. Users may elect to place liquid flavor enhancers in the diffusing cavity 504, which may steam the food contents therein, add additional moisture to the food contents, and produce a juicier and tastier final food product for consumption. Electing to use liquid flavor enhancers, as opposed to solid ones, may also speed up the cooking time of the food contents being cooked.

Figure 5:
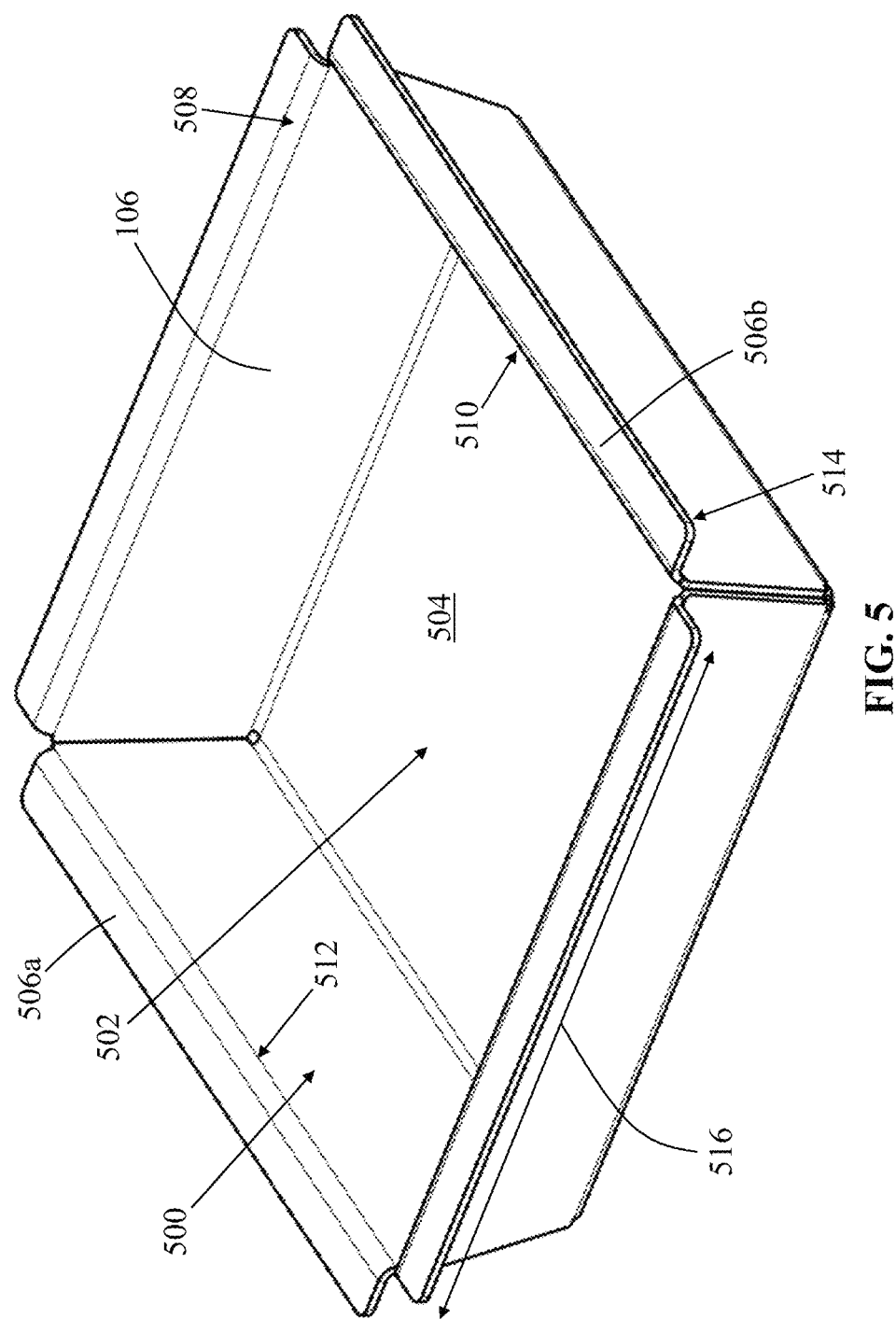
FIG. 5 is a downward facing perspective view of a diffusing tray, in accordance with the present invention.

The diffusing tray 106 is of a substantially rigid and heat-resistant material, wherein "substantially heat-resistant" is defined as any ceramic, metallic, or other material that can withstand temperatures greater than approximately 900° F. and "substantially rigid" is defined as any material that can resist deformation or abrasion with approximately 200 lbf tensile force, has a yield strength of approximately 20 KSI, or has a hardness greater than approximately 20 Rockwell B-Scale. As best seen in FIG. 5, the diffusing tray 106 has a diffusing tray length 516 that ranges approximately between 7 inches and 9 inches.

In accordance with a further feature, there is further provided a diffusing lid 108 selectively removably coupled to the diffusing tray 106 and of a size to cover the enclosed tray aperture 600, and defining at least one enclosed vent aperture 116a-n thereon, wherein "n" refers to any number greater than one. An object of the diffusing lid 108 is to rest on and cover the diffusing tray 106 so as to keep the combustible food contents housed inside the diffusing cavity 504 smoking instead of burning. This is accomplished by minimizing the oxygen inside the covered diffusing cavity 504, thereby reducing the chance that the combustibles inside will burn and ensuring that they smoke and cook thoroughly. Alternatively, users may elect to remove the diffusing lid 108 so as to facilitate a more direct diffusion of the flavor enhancers into the food contents, producing a more intense flavor.

The diffusing lid 108 is of a substantially rigid and heat-resistant material, wherein "substantially heat-resistant" is defined as any ceramic, metallic, or other material that can withstand temperatures greater than approximately 900° F. and "substantially rigid" is defined as any material that can resist deformation or abrasion with approximately 200 lbf tensile force, has a yield strength of approximately 20 KSI, or has a hardness greater than approximately 20 Rockwell B-Scale.

The at least one enclosed vent aperture 116a-n is designed to diffuse the enhanced air inside the diffusing cavity 504 into the inside of the grill in a controlled and prolonged manner. The food contents therein are thereby slowly and evenly infused with the particular flavor enhancer deposited inside the diffusing cavity 504.

Figure 2:
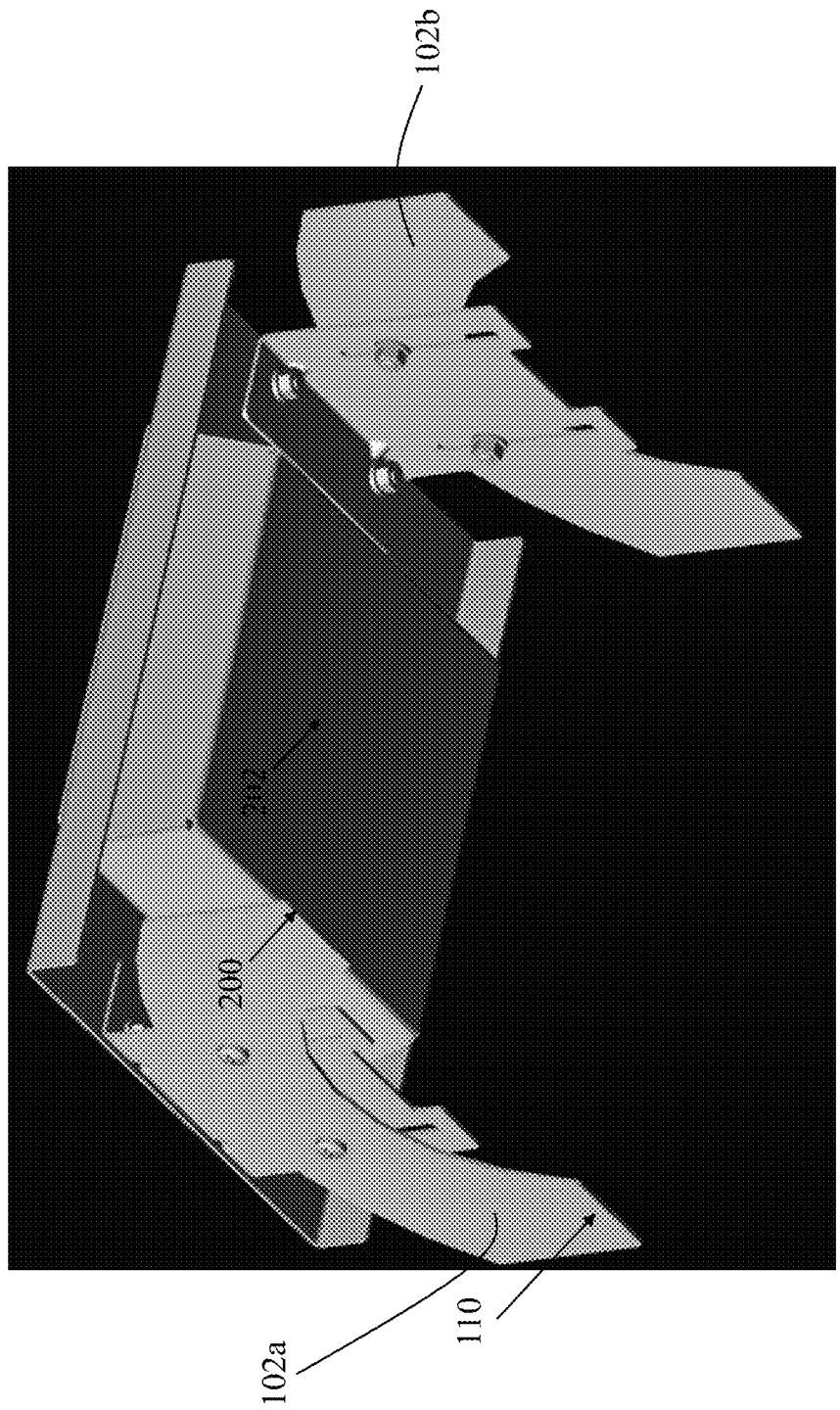
FIG. 2 is an upward facing perspective view of a diffuser, in accordance with the present invention.

In accordance with another embodiment of the present invention, the lower free end 110 of each of the two opposing legs 102a-b further comprises a substantially planar lower support surface 200, as best seen in FIG. 2, operably configured to be substantially co-planar with one another, wherein "planar" is defined as flat and two-dimensional and "co-planar" is defined as located along the same plane. An object of the substantially planar lower support surface 200 is to provide stability and balance to the diffuser 100 assembly, preventing the diffuser 100 from wobbling, teetering, or falling during use. The substantially planar nature of the lower support surface 200 achieves this objective by allowing for a direct and even contact between the substantially planar lower support surface 200 and the substantially planar grill or other surface on which the diffuser is laid to rest by a user.

Figure 3:
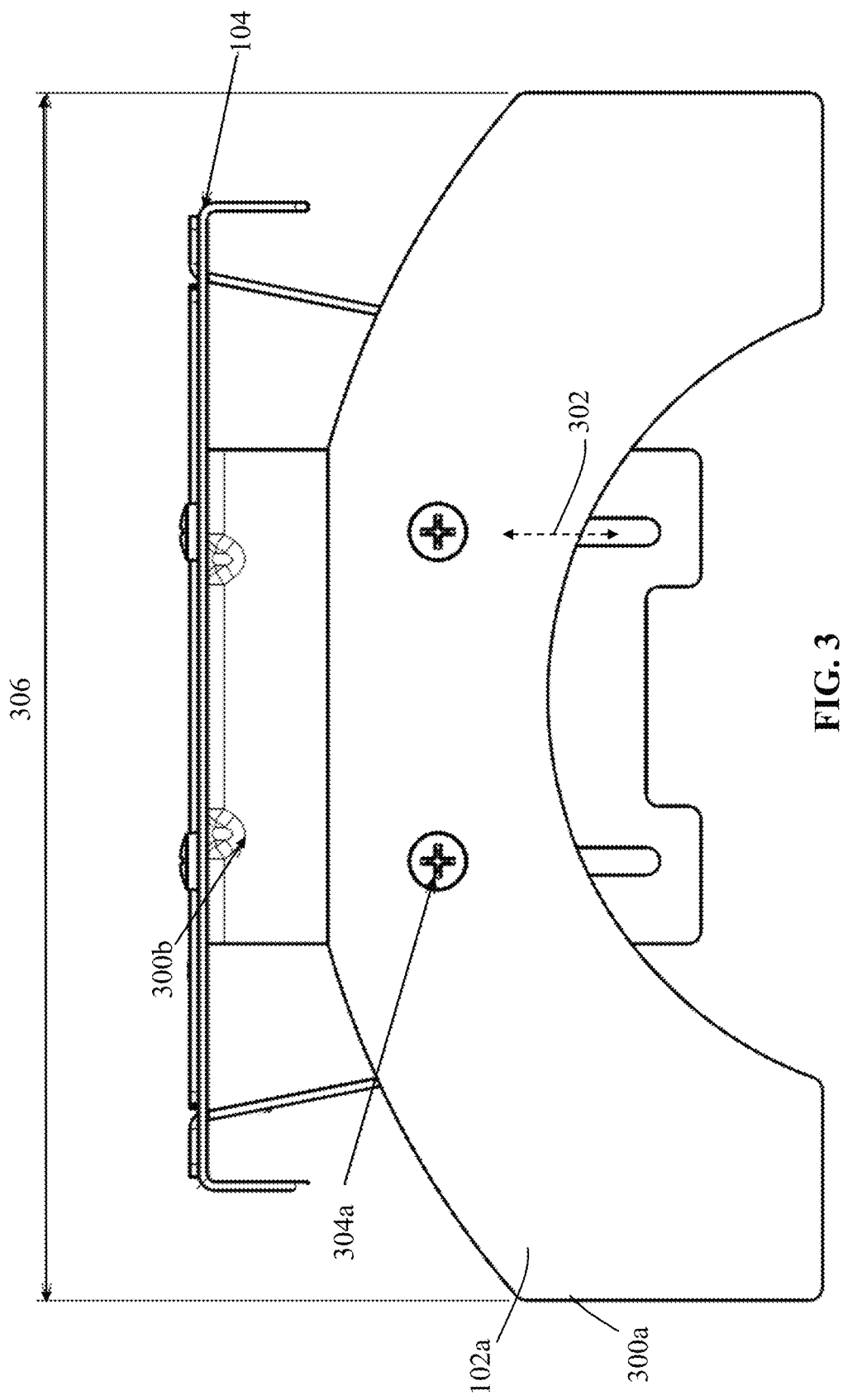
FIG. 3 is an elevational side view of a diffuser, in accordance with the present invention.

In another embodiment, and as best seen in FIGS. 2-3, each of the two opposing legs 102a-b further comprise a plurality of leg members 300a-b operably configured to selectively translate along a leg translation path 302 and positionally lock with respect to one another. In one embodiment, the translation path 302 adjusts the tray position length 400 that separates the bottom surface 202 of the bottom wall 502 from the lower free end 110 and that places the diffusing tray 106 in a suspended configuration above the fire pot to utilize the fire pot's intense flames, as discussed herein. This flexibility in height adjustments achieved by these additional features creates a universal fit amongst different grill sizes, shapes, and brands. It also allows a user to adjust the tray position length 400 to achieve the desired heat control. The plurality of leg members 300a-b may positionally lock into place by way of a snap hook, bolt, screw, nut, or other comparable locking mechanism. In another embodiment of the present invention, the platform body 104 may have a plurality of portions that may telescopically couple, extend, and retract with respect to one another to horizontally adjust, traverse, or move the platform body 104 to accommodate pellet grills where the fire pot is located to the side of a barrel rather than positioned in the center. In another embodiment, the top of the platform body 104 may horizontally adjust, traverse, or move by sliding the platform body 104 with respect to the legs(s) 102a-b (e.g., using a tongue-and-groove or fastener configuration).

In some embodiments, the plurality of leg members 300a-b are operably configured to selectively linearly translate with respect to one another. Said differently, the plurality of leg members 300a-b may be selectively adjusted up or down on the leg translation path 302. Dimensions may vary in various embodiments, but as seen in FIG. 3, a leg member length 306 ranges approximately between 10 inches and 12 inches.

In accordance with yet another embodiment, the enclosed tray aperture 600 is centrally disposed and defined by the upper wall 114 of the platform body 104. "Centrally" is defined as the geometric center, or centroid.

The sidewall 500 of the diffusing tray 106 may further comprise opposing flange members 506a-b disposed at an upper end 508 of the sidewall 500 and protruding from two opposing respective sides 510, 512 and having a lower surface 514 selectively, removably, and directly coupled to the upper wall 114 of the platform body 104. The opposing flange members 506a-b are designed to removably couple to the upper wall 114 of the platform body 104 so that the diffusing tray 106 is suspended above the fire pot, or other heat source, and to the platform body 104 by way of the opposing flange members 506a-b. This configuration prevents direct contact between the diffusing tray 106 and the fire source, which may burn or otherwise interfere with the effective diffusion of the flavor enhancers into the air.

In alternate embodiments, the sidewall 500 of the diffusing tray 106 further comprises flange members 506a-b disposed at, and protruding a perimeter around, an upper end 508 of the sidewall 500 and having a lower surface 514 selectively, removably, and directly coupled to the upper wall 114 of the platform body 104. While this configuration achieves many of the same objectives noted immediately prior, i.e. those achieved by claim 6, the uninterrupted protruding perimeter spanning around the upper end 508 of the sidewall 500 in this embodiment provides additional structural support in order to support the weight of particularly heavy flavor enhancing items placed inside the diffusing cavity 504, such as charcoal or coal briquettes.

In an exemplary embodiment, the diffusing lid 108 is of a size to cover at least approximately 90% of the enclosed tray aperture 600, thereby facilitating a slower and more controlled flavor and heat diffusion into the food contents in the grill. This additional feature also allows the user to effect greater heat control depending on the user's preferences and desired cooking technique. As seen best in FIG. 4, a lid length 404, spanning longitudinally from the lower free end 110 to the diffusing lid 108 ranges approximately between 5 inches and 6 inches.

In one embodiment, and as best seen in FIG. 8, the diffusing lid 108 includes a plurality of vent apertures 800a-n, wherein "n" refers to any number greater than one. The plurality of vent apertures 800a-n may be evenly distributed and spaced apart along the diffusing lid 108 so as to evenly distribute and diffuse enhanced air into the grill, providing even flavor diffusion for all food contents placed in the grill. The vent apertures 800a-n may further assist users in safely and easily removing the diffusing lid 108, particularly during use of the diffuser 100 when the high temperature of the diffuser 100 makes it impracticable for users to remove the entire diffuser 100 in order to add, remove, or change the flavor enhancers stored within the diffusing cavity 504. This may be accomplished by the use of an elongated hook or rod, of a ceramic, metal, or other substantially rigid and heat-resistant material, the curved end of which is inserted into and hooked on one of the vent apertures 800a-n, allowing the user to easily pull the entire diffusing lid 108 up and out of the grill. Users may then change out the flavoring enhancers as desired and place the diffusing lid 108 back onto the diffusing tray 106 by use of the elongated hook or rod.

In accordance with yet another embodiment, there is provided a universal and removable diffuser 100 for a grill comprising two opposing legs 102*a-b* having a lower free end 110 and an upper end 112 opposite the lower free end 110, and a platform body 104 coupled to, separating, and supported by the two opposing legs 102*a-b*, the platform body 104 having an upper wall 114 defining an enclosed tray aperture 600. There is also provided a diffusing tray 106 directly coupled to the platform body 104 and having a sidewall 500 surrounding a bottom wall 502 of the diffusing tray 106, the sidewall 500 and the bottom wall 502 defining a diffusing cavity 504 and a bottom surface 202 of the bottom wall 502 interposed between the enclosed tray aperture 600 and the lower free end 110 and defining a tray position length 400 separating the bottom surface 202 of the bottom wall 502 and the lower free end 110, and a diffusing lid 108 directly coupled to the diffusing tray 106 and of a size to cover the enclosed tray aperture 600, and defining at least one enclosed vent aperture 116*a-n* thereon, wherein "n" refers to any number greater than one.

In accordance with this embodiment, the two opposing legs 102*a-b*, the platform body 104, the diffusing tray 106, and the diffusing lid 108 may be of a material composition that is not substantially rigid or heat-resistant. Said differently, the material composition of these elements may not be substantially rigid or heat-resistant but the desired outcome, namely, sturdy structural support that does not readily burn or deform at high temperatures of heat, may nevertheless be achieved by the application of a substantially rigid or heat-resistant plating or coating to the identified elements. Some embodiments may entirely lack such a plating or coating, particularly where the diffuser is designed to be placed further away from the fire pot or other heat source, thereby eliminating the necessity for such a heat-resistant feature entirely. In still other embodiments, at least one of the two opposing legs 102*a-b*, the platform body 104, the diffusing tray 106, or the diffusing lid 108 may be of a substantially rigid and heat-resistant material, depending on how the diffuser 100 will be used and the proximity with which each of the named elements will be exposed to high levels of heat.

Certain embodiments may feature the diffusing lid 108 as selectively removably coupled to the diffusing tray 106, rather than directly coupled or affixed to it. In those embodiments where the diffusing lid 108 is directly coupled to the diffusing tray 106, users may place and/or remove liquid and solid flavor enhancers from the diffusing cavity 504 via the at least one enclosed vent aperture 116*a-n* disposed on the diffusing lid 108. By having the diffusing tray 106 and the diffusing lid 108 directly coupled together, a greater ease of use is facilitated whereby users do not have to take apart multiple parts but merely need fill and empty the diffusing cavity 504 via the at least one enclosed vent aperture 116*a-n*. In accordance with a further feature of this embodiment, the diffusing lid 108 may include a plurality of vent apertures 800*a-n* thereon, providing even heat and flavor distribution and diffusion to the food contents within the grill.

Various modifications and additions can be made to the exemplary embodiments discussed without departing from the scope of the present disclosure. For example, while the embodiments described above refer to particular features, the scope of this disclosure also includes embodiments having different combinations of features and embodiments that do not include all of the above described features.

What is claimed is:

1. A pellet grill with universal and removable diffuser assembly comprising:
   a pellet grill having an internal grill surface supporting a fire pot housing for receiving pellets of the pellet grill;
   two opposing legs each of substantially rigid and heat-resistant material and having a lower free end and an upper end opposite the lower free end;
   a platform body of a substantially rigid and heat-resistant material and coupled to, separating, and supported by the two opposing legs, the platform body and having an upper wall defining an enclosed tray aperture centrally disposed thereon and defined by the upper wall of the platform body and over the f ire pot housing and with two opposing upper wall portions each spanning inwardly from a respective one of the two opposing legs and having an edge defining opposing side portions of the enclosed tray aperture;
   a diffusing tray selectively removably coupled to the two opposing upper wall portions of the platform body, of a substantially rigid and heat-resistant material, and having a sidewall surrounding a bottom wall of the diffusing tray and with the sidewall spanning downwardly towards the lower free ends of the two opposing legs and across the edges of the two opposing upper wall portions, thereby causing the diffusing tray to be placed in a suspended configuration relative to the upper wall of the platform body, the sidewall and the bottom wall defining a diffusing cavity and a bottom surface of the bottom wall interposed between the enclosed tray aperture and the lower free end and defining a tray position length separating the bottom surface of the bottom wall and the lower free end and with the two opposing legs operably configured to selectively translate along a leg translation path to adjust the tray position length to enable the bottom surface of the bottom wall of the diffusing tray to be moved further away from the fire pot housing and placed in the suspended configuration directly above the fire pot housing within the pellet grill and achieve desired heat control, wherein the diffusing tray is removable to enable the fire pot housing to generate intense flames directly below the enclosed tray aperture; and
   a diffusing lid selectively removably directly coupled to the diffusing tray, of a substantially rigid and heat-resistant material, and of a size to cover the enclosed tray aperture, and defining at least one enclosed vent aperture thereon.

2. The pellet grill with universal and removable diffuser assembly according to claim 1, wherein the lower free end of each of the two opposing legs further comprise:
   a substantially planar lower support surface operably configured to be substantially co-planar with one another.

3. The pellet grill with universal and removable diffuser assembly according to claim 1, wherein each of the two opposing legs further comprise:
   a plurality of leg members operably configured to selectively translate along the leg translation path and positionally lock with respect to one another.

4. The pellet grill with universal and removable diffuser assembly according to claim 3, wherein:
   the plurality of leg members are operably configured to selectively linearly translate with respect to one another.

5. The pellet grill with universal and removable diffuser assembly according to claim 1, wherein the sidewall of the diffusing tray further comprises:
opposing flange members disposed at an upper end of the sidewall and protruding from two opposing respective sides and having a lower surface selectively, removably, and directly coupled to the upper wall of the platform body.

6. The pellet grill with universal and removable diffuser assembly according to claim 1, wherein the sidewall of the diffusing tray further comprises:
flange members disposed at, and protruding a perimeter around, an upper end of the sidewall and having a lower surface selectively, removably, and directly coupled to the upper wall of the platform body.

7. The pellet grill with universal and removable diffuser assembly according to claim 1, wherein:
the diffusing lid is of a size to cover at least approximately 90% of the enclosed tray aperture.

8. The pellet grill with universal and removable diffuser assembly according to claim 1, wherein:
the diffusing lid includes a plurality of vent apertures thereon.

9. A pellet grill with universal and removable diffuser assembly comprising:
a pellet grill having an internal grill surface supporting a fire pot housing for receiving pellets of the pellet grill;
two opposing legs having a lower free end and an upper end opposite the lower free end;
a platform body coupled to, separating, and supported by the two opposing legs, the platform body having an upper wall defining an enclosed tray aperture centrally disposed thereon and defined by the upper wall of the platform body and over the fire pot housing and with two opposing upper wall portions each spanning inwardly from a respective one of the two opposing legs and having an edge defining opposing side portions of the enclosed tray aperture;
a diffusing tray selectively, removably, and directly coupled to the two opposing upper wall portions of the platform body and having a sidewall surrounding a bottom wall of the diffusing tray and with the sidewall spanning downwardly towards the lower free ends of the two opposing legs and across the edges of the two opposing upper wall portions, thereby causing the diffusing tray to be moved further away from the fire pot housing and placed in a suspended configuration relative to the upper wall of the platform body, the sidewall and the bottom wall defining a diffusing cavity and a bottom surface of the bottom wall interposed between the enclosed tray aperture and the lower free end and defining a tray position length separating the bottom surface of the bottom wall and the lower free end and with the bottom surface of the bottom wall of the diffusing tray in the suspended configuration directly above the fire pot housing within pellet grill, wherein the diffusing tray is removable to enable the fire pot housing to generate intense flames directly below the enclosed tray aperture; and
a diffusing lid directly coupled to the diffusing tray and of a size to cover the enclosed tray aperture, and defining at least one enclosed vent aperture thereon.

10. The pellet grill with universal and removable diffuser assembly according to claim 9, wherein:
at least one of the two opposing legs, the platform body, the diffusing tray, or the diffusing lid is of a substantially rigid and heat-resistant material.

11. The pellet grill with universal and removable diffuser assembly according to claim 9, wherein:
the diffusing lid includes a plurality of vent apertures thereon.

* * * * *